US012696169B2

(12) United States Patent
Iwayama et al.

(10) Patent No.: US 12,696,169 B2
(45) Date of Patent: Jul. 28, 2026

(54) TERMINAL DEVICE, COMMUNICATION METHOD, AND COMMUNICATION SYSTEM

(71) Applicant: Mitsubishi Electric Corporation, Tokyo (JP)

(72) Inventors: Naofumi Iwayama, Tokyo (JP); Mitsuru Mochizuki, Tokyo (JP); Fumiki Hasegawa, Tokyo (JP); Tadahiro Shimoda, Tokyo (JP); Masuo Ito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 382 days.

(21) Appl. No.: 17/771,699

(22) PCT Filed: Dec. 24, 2020

(86) PCT No.: PCT/JP2020/048527
§ 371 (c)(1),
(2) Date: Apr. 25, 2022

(87) PCT Pub. No.: WO2021/132498
PCT Pub. Date: Jul. 1, 2021

(65) Prior Publication Data
US 2022/0417828 A1      Dec. 29, 2022

(30) Foreign Application Priority Data
Dec. 27, 2019      (JP) .................................. 2019-239086

(51) Int. Cl.
*H04W 40/24*          (2009.01)
*H04W 8/00*           (2009.01)
(Continued)

(52) U.S. Cl.
CPC ......... *H04W 40/246* (2013.01); *H04W 40/12* (2013.01); *H04W 76/14* (2018.02); *H04W 88/04* (2013.01)

(58) Field of Classification Search
CPC ... H04W 40/12; H04W 40/22; H04W 40/246; H04W 76/02; H04W 76/023;
(Continued)

(56) References Cited

U.S. PATENT DOCUMENTS 10,582,443 B2 *    3/2020  Atarius ................. H04L 12/189
2017/0019778 A1 *  1/2017  Jung ..................... H04W 8/005
(Continued)

FOREIGN PATENT DOCUMENTS

JP          2005-252858 A      9/2005
JP          2006-287477 A      10/2006
JP          2012-15897 A       1/2012

OTHER PUBLICATIONS

3GPP TR 23.713 V13.0.0; Services and Systems Aspects; Sutdy on extended architecture support for proximity-based services ( Release 13) Sep. 2015 (Year: 2015).*
(Continued)

*Primary Examiner* — Moo Jeong
*Assistant Examiner* — Scott A Schlack
(74) *Attorney, Agent, or Firm* — Birch, Stewart, Kolasch & Birch, LLP

(57)                    ABSTRACT

A terminal device having a relay function of relaying a signal received from a first peripheral terminal among peripheral terminals, which are other terminal devices available for direct communication with the terminal device, to a second peripheral terminal among the peripheral terminals, the terminal device including: a detection unit that detects the peripheral terminals; a storage unit that holds peripheral terminal information that is information on each of the
(Continued)

peripheral terminals detected by the detection unit; and an information notification unit that transmits a notification message for notifying the other terminal devices of information on the terminal device, the notification message including the peripheral terminal information held by the storage unit.

9 Claims, 12 Drawing Sheets

(51) Int. Cl.

| | | |
|---|---|---|
| *H04W 40/12* | (2009.01) | |
| *H04W 40/22* | (2009.01) | |
| *H04W 40/34* | (2009.01) | |
| *H04W 76/14* | (2018.01) | |
| *H04W 88/04* | (2009.01) | |

(58) Field of Classification Search
CPC . H04W 76/027; H04W 76/028; H04W 76/14; H04W 76/27; H04W 76/30; H04W 28/0263; H04W 28/16; H04W 24/10; H04W 24/12; H04W 72/02; H04W 72/0406; H04W 72/121; H04B 7/0617; H04B 7/14; H04B 7/15528; H04B 7/15557; H04B 7/15585
See application file for complete search history.

(56) References Cited

U.S. PATENT DOCUMENTS

| | | | |
|---|---|---|---|
| 2017/0164332 A1* | 6/2017 | Kim | H04W 72/02 |
| 2017/0359766 A1 | 12/2017 | Agiwal et al. | |
| 2018/0152234 A1* | 5/2018 | Huang | H04W 76/23 |
| 2019/0372653 A1* | 12/2019 | Chae | H04W 72/20 |
| 2021/0153063 A1* | 5/2021 | Zhang | H04W 28/0263 |
| 2021/0160956 A1* | 5/2021 | Wang | H04W 40/34 |
| 2021/0274422 A1* | 9/2021 | Norp | H04W 40/22 |
| 2022/0225448 A1* | 7/2022 | Li | H04W 8/005 |
| 2022/0248298 A1* | 8/2022 | Liu | H04L 45/20 |

OTHER PUBLICATIONS

3GPP TR 23.713 V13.0.0; Services and Systems Aspects; Study on extended architecture support for proximity based services: Rel. 13 (Sep. 2015) (Year: 2019).*

"3rd Generation Partnership Project; Technical Specification Group Services and System Aspects; Study on Extended Architecture Support for Proximity-based Services (Release 13)", 3GPP Standard, Technical Report, vol. SA WG2, No. V13.0.0, Sep. 15, 2015 pp. 1-80.

Extended European Search Report issued Jan. 2, 2023 in corresponding European Patent Application No. 20906866.7.

Office Action issued Jan. 4, 2023 in corresponding Japanese Patent Application No. 2021-567635 with English Translation.

ZTE: "Resource Allocation for Relay and Remote UE", 3GPP Draft; R2-152552, May 16, 2015, pp. 1-4, XP050973523.

Chinese Office Action and Search Report for Chinese Application No. 202080088668.X, dated Feb. 8, 2024, with English translation.

3GPP TR 23.703 V12.0.0 (Feb. 2014); 3rd Generation Partnership Project; Technical Specification Group Services and System Aspects; Study on architecture enhancements to support Proximity-based Services (ProSe) (Release 12); Total 7 pages.

3GPP TS 23.303 V15.1.0 (Jun. 2018); 3rd Generation Partnership Project; Technical Specification Group Services and System Aspects; Proximity-based services (ProSe); Stage 2 (Release 15). Total 10 pages.

International Search Report (PCT/ISA/210) issued in PCT/JP2020/048527 mailed on Apr. 6, 2021.

Written Opinion (PCT/ISA/237) issued in PCT/JP2020/048527 mailed on Apr. 6, 2021.

Chinese Office Action for Chinese Application No. 202080088668.X, dated Jul. 17, 2024, with English translation.

* cited by examiner

UE#1

UE#2
(relay#1)

UE#4
(relay#2)

UE#3

TERMINAL DEVICE, COMMUNICATION METHOD, AND COMMUNICATION SYSTEM

FIELD

The present disclosure relates to a terminal device that has a function of directly communicating with another terminal device, a communication method, and a communication system.

BACKGROUND

As one of functions of a terminal device (hereinafter referred to as a terminal) of a wireless communication system, direct communication between terminals, which is a function of directly communicating with another terminal without passing through a base station, is disclosed in Non Patent Literature 1.

Non Patent Literature 1 defines two methods being Model A and Model B as methods of discovering a terminal to be a communication counterpart when terminals initiate direct communication with each other. In the Model A method, a certain terminal broadcasts its own information to the surroundings, and another terminal receives the information to discover a terminal to be the communication counterpart. On the other hand, in the Model B method, a terminal wishing to discover a communication counterpart transmits information about the communication counterpart, and a terminal having received the information responds if available for becoming the communication counterpart.

Non Patent Literature 1 further defines a method in which a first terminal unable to perform direct communication with the base station, and a second terminal connected to the base station (terminal capable of communicating with the base station) use the aforementioned direct communication between terminals, so that the first terminal communicates with the base station via the second terminal. In the direct communication between terminals in this case as well, the terminal desiring the direct communication between terminals discovers the terminal to be the communication counterpart by the method of Model A or Model B described above. In the case of the Model A method, the second terminal transmits a message containing information that indicates that the second terminal can relay a signal between another terminal and the base station, and the first terminal can know the presence of the second terminal by receiving the message. Moreover, in the case of the Model B method, the first terminal unable to communicate with the base station transmits a message for discovering a terminal operable as a relay terminal that relays a signal with the base station, and when the second terminal receives the message and returns a response message, the first terminal can know the presence of the second terminal.

In addition, Non Patent Literature 2 discloses a method in which two terminals in a positional relationship that does not allow for direct communication communicate with each other via another terminal capable of direct communicate with both of these two terminals.

In the case of performing the communication disclosed in Non Patent Literature 2, each terminal discovers another terminal capable of direct communication by a procedure similar to that of the Model A method or Model B method described above. After that, in the case of communicating with a terminal unable to perform direct communication, each terminal transmits a message containing information of the terminal to be the communication counterpart, and a terminal having received the message transmits a response message to the received message when capable of operating as a relay that relays a signal between the terminal as the source of the message and the terminal to be the communication counterpart thereof. The terminal that has received the response message initiates communication via the terminal operable as the relay. Note that, in Non Patent Literature 2, the terminal operating as the relay that relays a signal bidirectionally between two terminals is referred to as a "UE-to-UE relay". For convenience, the "UE-to-UE relay" is referred to as a relay station in the present description.

CITATION LIST

Non Patent Literature

Non Patent Literature 1: 3GPP TS 23.303, V15.1.0 (2018 June)

Non Patent Literature 2: 3GPP TR 23.703, V12.0.0 (2014 February)

SUMMARY

Technical Problem

As described above, in the communication method described in Non Patent Literature 2, when two terminals cannot directly communicate with each other and thus perform communication via a relay station, the terminal that is to initiate the communication transmits a message containing information of the counterpart terminal to surrounding terminals that have been discovered, and grasps a terminal that can be the relay station by receiving a response message to the message. Therefore, there is a problem in that it takes time to select the relay station, establish a communication line, and enable the communication.

The present disclosure has been made in view of the above, and an object of the present disclosure is to provide a terminal device capable of shortening the time required for a communication line to be established between terminal devices that perform communication via a relay station.

Solution to Problem

To solve the above problem and achieve an object, the present disclosure is related to a terminal device having a relay function of relaying a signal received from a first peripheral terminal among peripheral terminals, which are other terminal devices available for direct communication with the terminal device, to a second peripheral terminal among the peripheral terminals, the terminal device including: a detection unit to detect the peripheral terminals; a storage unit to hold peripheral terminal information that is information on each of the peripheral terminals detected by the detection unit; and an information notification unit to transmit a notification message for notifying the other terminal devices of information on the terminal device, the notification message including the peripheral terminal information held by the storage unit.

Advantageous Effects of Invention

The terminal device according to the present disclosure can shorten the time required for the communication line to be established between the terminal devices that perform communication via the relay station.

DESCRIPTION OF EMBODIMENTS

A terminal device, a communication method, and a communication system according to embodiments of the present disclosure will now be described in detail with reference to the drawings.

First Embodiment

Figure 1:
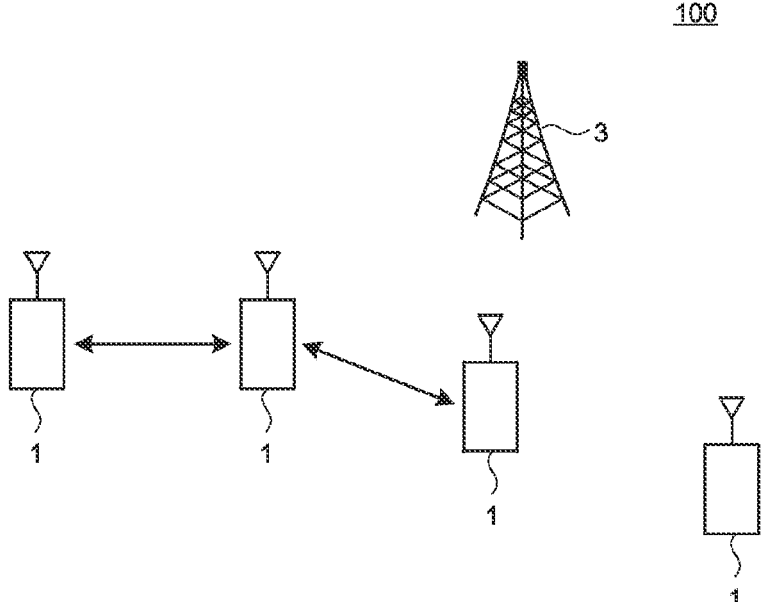
FIG. 1 is a diagram illustrating an example of a configuration of a communication system implemented by applying terminal devices according to a first embodiment.

FIG. 1 is a diagram illustrating an example of a configuration of a communication system implemented by applying terminal devices according to a first embodiment.

A communication system 100 according to the first embodiment includes terminal devices 1 and a base station 3. The terminal device 1 can perform terminal-to-terminal communication for directly communicating with another one of the terminal devices 1 in addition to a function of communicating with the base station 3 connected to a core network. The terminal device 1 can also communicate with another one of the terminal devices 1 that is a target device via one or more of the other terminal devices 1 by using the terminal-to-terminal communication. Each terminal device 1 can operate as a relay station that relays a signal bidirectionally between two of the other terminal devices 1 when in a state capable of directly communicating with both of the two other terminal devices 1 that are in a positional relationship in which the terminal-to-terminal communication cannot be performed.

Because the terminal device 1 according to the first embodiment is characterized by the operation of performing the terminal-to-terminal communication via the relay station, a part related to the terminal-to-terminal communication via the relay station will be described. Moreover, an operation in a case where the terminal device 1 performs communication via the base station 3 and an operation in a case where the terminal devices 1 directly communicate with each other are similar to those of a related art, whereby description thereof will be omitted. Note that, in the following description, the terminal device 1 may be referred to as user equipment (UE).

Figure 2:
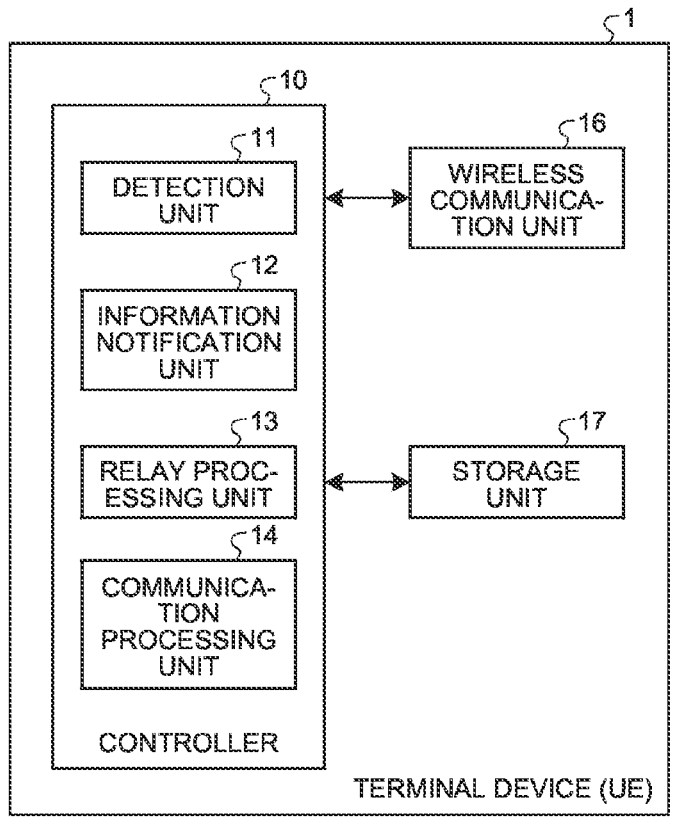
FIG. 2 is a diagram illustrating an example of a functional block configuration of the terminal device according to the first embodiment.

FIG. 2 is a diagram illustrating an example of a functional block configuration of the terminal device 1 according to the first embodiment. The terminal device 1 includes a controller 10, a wireless communication unit 16, and a storage unit 17. The controller 10 includes a detection unit 11, an information notification unit 12, a relay processing unit 13, and a communication processing unit 14.

Here, hardware for implementing each unit of the terminal device 1 illustrated in FIG. 2 will be described. The controller 10 is implemented by a central processing unit (CPU) (also referred to as a central processor, a processing unit, an arithmetic unit, a processor, a microprocessor, or a microcomputer). That is, the detection unit 11, the information notification unit 12, the relay processing unit 13, and the communication processing unit 14 of the controller 10 are implemented by the CPU executing a program in which processing executed by each of these units is described. The wireless communication unit 16 is implemented by an electronic circuit including a modem, an analog-to-digital converter, a digital-to-analog converter, a frequency converter, an amplifier, an antenna, and the like. The storage unit 17 is implemented by a random access memory (RAM), a flash memory, or the like. Note that the detection unit 11, the information notification unit 12, and the relay processing unit 13 of the controller 10 can also be implemented by dedicated processing circuitry such as a field programmable gate array (FPGA), an application specific integrated circuit (ASIC), or a digital signal processor (DSP). Moreover, a part of the detection unit 11, the information notification unit 12, the relay processing unit 13, and the communication processing unit 14 of the controller 10 may be implemented by the CPU, and the rest thereof may be implemented by dedicated processing circuitry.

Each unit of the terminal device 1 illustrated in FIG. 2 will be described. The detection unit 11 detects a peripheral terminal that is another one of the terminal devices 1 capable of directly communicating with the terminal device 1. The information notification unit 12 transmits a message including information on the peripheral terminal detected by the detection unit 11 and information on its own device (the terminal device 1) to the other terminal devices 1. In a case of operating as the relay station, the relay processing unit 13 receives a signal transmitted from one of two of the other terminal devices 1 communicating via the relay station, and relays the signal to the other terminal device 1. The communication processing unit 14 transmits and receives a signal to and from the other terminal devices 1. The wireless communication unit 16 performs reception processing and transmission processing of a wireless signal. The storage unit 17 holds various types of information including the information on the peripheral terminal detected by the detection unit 11.

Figure 3:
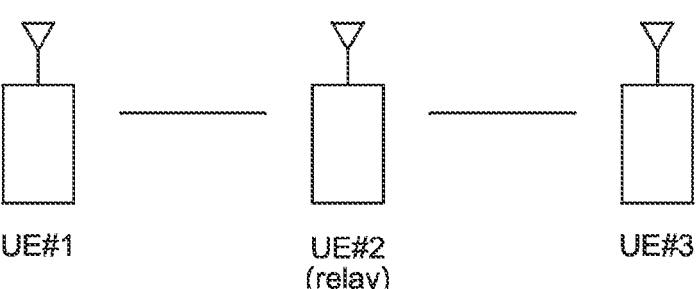
FIG. 3 is a diagram for explaining an operation of the terminal devices according to the first embodiment.

Next, a description will be made of an operation in which each terminal device 1 of the communication system 100 according to the present embodiment performs the terminal-to-terminal communication via a relay station. The present embodiment will describe an operation illustrated in FIG. 3, specifically, an operation in which UE #2 operates as the relay station (relay), and UE #1 and UE #3 communicate with each other via the UE #2.

Figure 4:
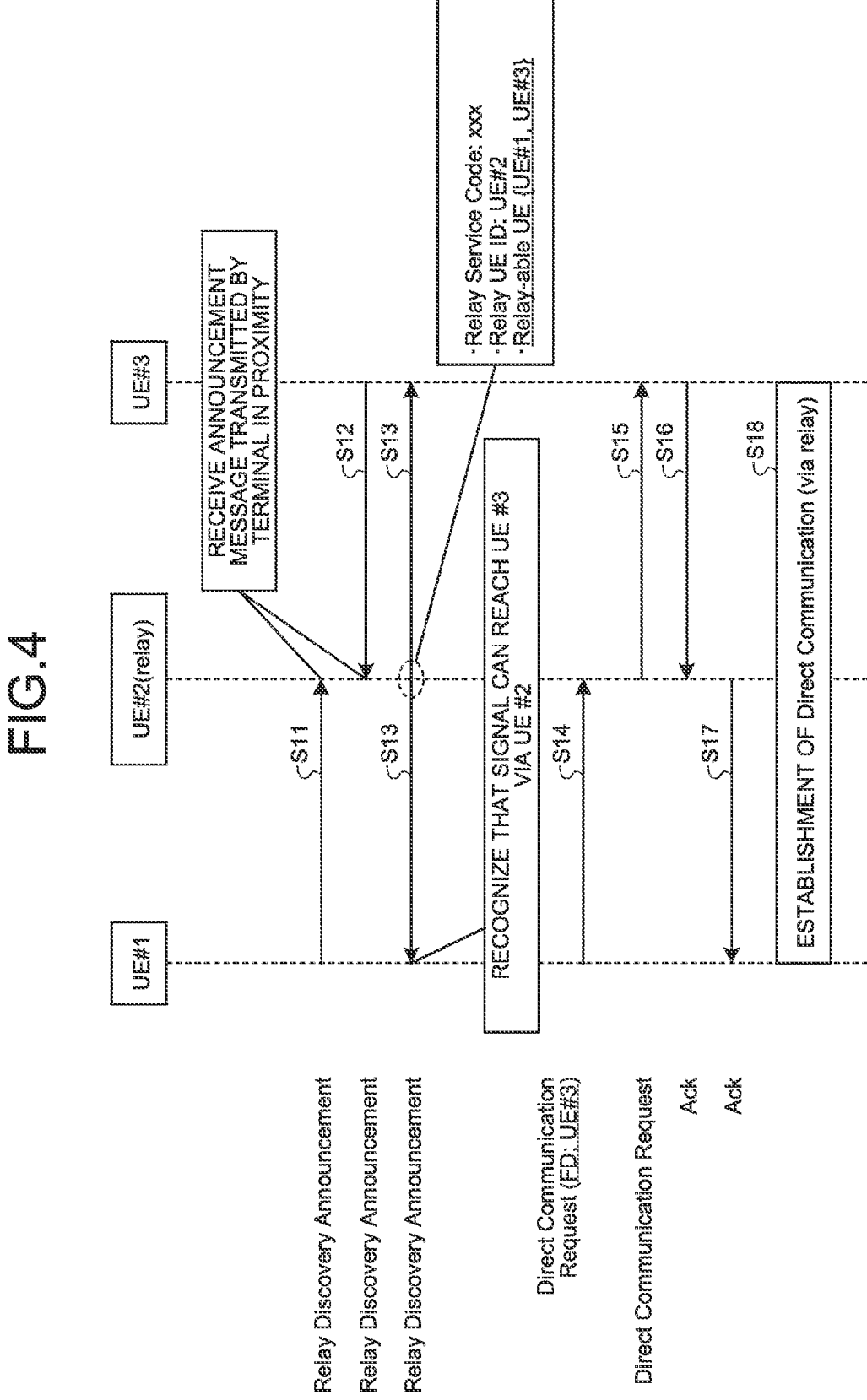
FIG. 4 is a diagram illustrating an example of a sequence of an operation in which the terminal devices according to the first embodiment perform terminal-to-terminal communication via a relay station.

FIG. 4 is a diagram illustrating an example of a sequence of the operation in which the terminal devices 1 according to the first embodiment perform the terminal-to-terminal communication via a relay station.

The UE #1, the UE #2, and the UE #3 transmit "Relay Discovery Announcement" or "Discovery Announcement", which is an announcement message for notifying another UE of the presence of the UE #1, the UE #2, and the UE #3, respectively, at a predetermined timing (steps S11 to S13). At this time, each UE broadcasts the announcement message including its own terminal ID (identification) and a peripheral terminal ID that is the information on the peripheral terminal held in the storage unit 17. Note that, in each UE, the detection unit 11 generates the announcement message and broadcasts the announcement message via the wireless communication unit 16. The detection unit 11 includes all the peripheral terminal IDs held in the storage unit 17 in the announcement message. In a case where the storage unit 17 does not hold the peripheral terminal ID, the detection unit 11 generates and transmits the announcement message including only the own terminal ID of the UE. The announcement message transmitted by each of the UE #1 to UE #3 in steps S11 to S13 is an example of a notification message for the UE to notify another UE of the own information on each UE.

In the example illustrated in FIG. 4, the UE #1 first transmits the announcement message (step S11), then the UE #3 transmits the announcement message (step S12), and finally the UE #2 transmits the announcement message (step S13). The UE #1 and the UE #3 have not detected a peripheral terminal at the time of transmitting the announcement message, and do not hold the peripheral terminal ID. Therefore, in steps S11 and S12, the announcement message not including the peripheral terminal ID is transmitted.

The UE #2 extracts the terminal ID of the UE #1 upon receiving the announcement message transmitted in step S11. Specifically, the detection unit 11 of the UE #2 extracts the terminal ID of the UE #1 from the announcement message received, and stores the terminal ID as the peripheral terminal ID in the storage unit 17. Likewise, the UE #2 extracts the terminal ID of the UE #3 upon receiving the announcement message transmitted in step S12. Specifically, the detection unit 11 of the UE #2 extracts the terminal ID of the UE #3 from the announcement message received, and stores the terminal ID as the peripheral terminal ID in the storage unit 17. The UE #2 thus detects the UE #1 and the UE #3 as the peripheral terminals.

In the subsequent step S13, the UE #2 transmits the announcement message including its own terminal ID and the terminal IDs of the UE #1 and UE #3 as the peripheral terminal IDs, and the UE #1 and the UE #3 receive the announcement message. FIG. 4 illustrates an example in which the announcement message transmitted by the UE #2 includes "Relay Service Code", "Relay UE ID", and "Relay-able UE" as parameters. The parameter "Relay Service Code" indicates a service that the UE #2 can perform relay as the relay station. The parameter "Relay UE ID" indicates the terminal ID of the UE #2. The parameter "Relay-able UE" indicates the peripheral terminal IDs held by the UE #2, or the terminal devices to which the UE #2 can relay a signal.

The announcement message transmitted by each of the UE #1 to the UE #3 in steps S11 to S13 is assumed to be a message having a configuration obtained by extending "Relay Discovery Announcement message" defined in Non Patent Literature 1 above and adding "Relay-able UE" as a new parameter.

Upon receiving the announcement message transmitted in step S13, the UE #1 recognizes that the UE #3 is included as the peripheral terminal of the UE #2, that is, a signal addressed to the UE #3 can reach the UE #3 via the UE #2. The detection unit 11 of the UE #1 receives the announcement message, extracts the terminal ID of the UE #3 from the announcement message, and causes the storage unit 17 to store the terminal ID of the UE #3 in association with the terminal ID of the UE #2. Likewise, upon receiving the announcement message transmitted in step S13, the UE #3 recognizes that a signal addressed to the UE #1 can reach the UE #1 via the UE #2.

Note that every time each of the UE #1 to the UE #3 receives the announcement message, each of the UE #1 to the UE #3 extracts the peripheral terminal ID from the received message and updates the peripheral terminal ID (the peripheral terminal ID of the UE that has transmitted the announcement message) held in the storage unit 17.

Upon recognizing that communication can be established with the UE #3 via the UE #2, the UE #1 transmits "Direct Communication Request", which is a direct communication request message for requesting initiation of the terminal-to-terminal communication, to the UE #2 while including therein the terminal ID of the UE #3 that is the counterpart terminal of the terminal-to-terminal communication via a relay station (step S14). The communication processing unit 14 transmits the direct communication request message. In FIG. 4, a parameter indicating the counterpart terminal of the terminal-to-terminal communication is expressed by Final Destination (FD), and the counterpart terminal is described following "FD:".

The direct communication request message transmitted by the UE #1 in step S14 is assumed to be a message having a configuration obtained by extending "Direct Communication Request message" defined in Non Patent Literature 1 above and adding "Final Destination" as a new parameter.

Upon receiving the direct communication request message including the terminal ID of the UE #3 indicating the FD, the UE #2 transfers the direct communication request message to the UE #3 (step S15). In step S15, the relay processing unit 13 operates as a proxy of the UE #1 and transmits a direct communication request message not including the FD, that is, a direct communication request message whose source and destination are the UE #2 and the UE #3, respectively.

Note that if the UE #2 receives a direct communication request message including no FD from the UE #1, the UE #2 determines that the UE #1 desires direct communication with the UE #2 and performs processing for initiating direct communication with the UE #1. The operation of the UE #2 in this case is similar to the operation in the case where UEs directly communicate with each other defined in Non Patent Literature 1. That is, the UE #2 determines that the terminal-to-terminal communication with the UE #2 is requested when receiving the direct communication request message including no FD, or determines that the terminal-to-terminal communication via the UE #2 is requested when receiving the direct communication request message including the FD.

Upon receiving the direct communication request message from the UE #2, the UE #3 returns Acknowledgement (Ack) (step S16). The communication processing unit 14 receives the direct communication request message and returns the "Ack".

Upon receiving the "Ack" for the direct communication request message transmitted in step S15, the relay processing unit 13 of the UE #2 transmits "Ack" for the direct communication request message received in step S14 to the UE #1 (step S17).

When the UE #1 receives the "Ack" for the direct communication request message transmitted in step S14, a communication line via the UE #2 is established between the UE #1 and the UE #3 (step S18). Note that in FIG. 4, the establishment of the communication line via the UE #2 is described as "establishment of direct communication (via relay)". The communication line may also be referred to as a link.

As described above, when the terminal device 1 according to the first embodiment transmits the announcement message for notifying another UE of the presence of the terminal device 1, the terminal device 1 transmits the announcement message including the peripheral terminal ID indicating the peripheral terminal that has been detected at that time. As a result, the terminal device 1 that has received the announcement message can simultaneously detect the peripheral terminal and another one of the terminal devices 1 available for communication via the peripheral terminal, thereby being able to shorten the time required until the communication line is established when communicating with the other terminal device 1 via the peripheral terminal.

In the present embodiment, the terminal device 1 detects the peripheral terminal by changing a part of the procedure corresponding to the aforementioned Model A method described in Non Patent Literature 1. Therefore, the terminal-to-terminal communication via a relay station can be implemented by a simple change using an existing method.

Note that the present embodiment has illustrated the example in which the terminal device 1 detects the peripheral terminal by receiving the announcement message, but the method of detecting the peripheral terminal is not limited thereto. The terminal device 1 may, for example, collect information on the peripheral terminal via the base station 3. For example, the base station 3 identifies the location of each terminal device 1 in range, and detects the peripheral terminal of each terminal device 1 on the basis of the identified location. The base station 3 notifies each terminal device 1 of the peripheral terminal of each terminal device 1.

Moreover, when communicating with another one of the terminal devices 1 via the peripheral terminal, the terminal device 1 transmits a direct communication request message including the terminal ID of the other terminal device 1 (hereinafter referred to as an FD-ID), which is to be the communication counterpart, to the peripheral terminal operating as the relay station. As a result, on the basis of whether or not the direct communication request message includes the FD-ID, the peripheral terminal operating as the relay station can determine whether signal relay processing is to be performed as the relay station, or the terminal device 1 that is the source of the direct communication request message is requesting communication with the peripheral terminal.

In the present embodiment, the announcement message includes the peripheral terminal ID indicating the peripheral terminal that has been detected, but may include another parameter in addition thereto. For example, a parameter indicating whether or not the terminal is in a state operable as the relay station may be included.

Second Embodiment

Next, a terminal device according to a second embodiment will be described. A configuration of a communication system implemented by applying the terminal device according to the second embodiment is similar to that of the first embodiment (see FIG. 1). A functional block configuration of the terminal device according to the second embodiment is also similar to that of the first embodiment (see FIG. 2). The present embodiment will describe differences from the first embodiment.

A description will be made of an operation in which each terminal device 1 of the communication system 100 according to the present embodiment performs the terminal-to-terminal communication via a relay station. As with the first embodiment, the operation illustrated in FIG. 3, specifically, the operation in which the UE #2 operates as the relay station, and the UE #1 and the UE #3 communicate with each other via the UE #2 will be described.

Figure 5:
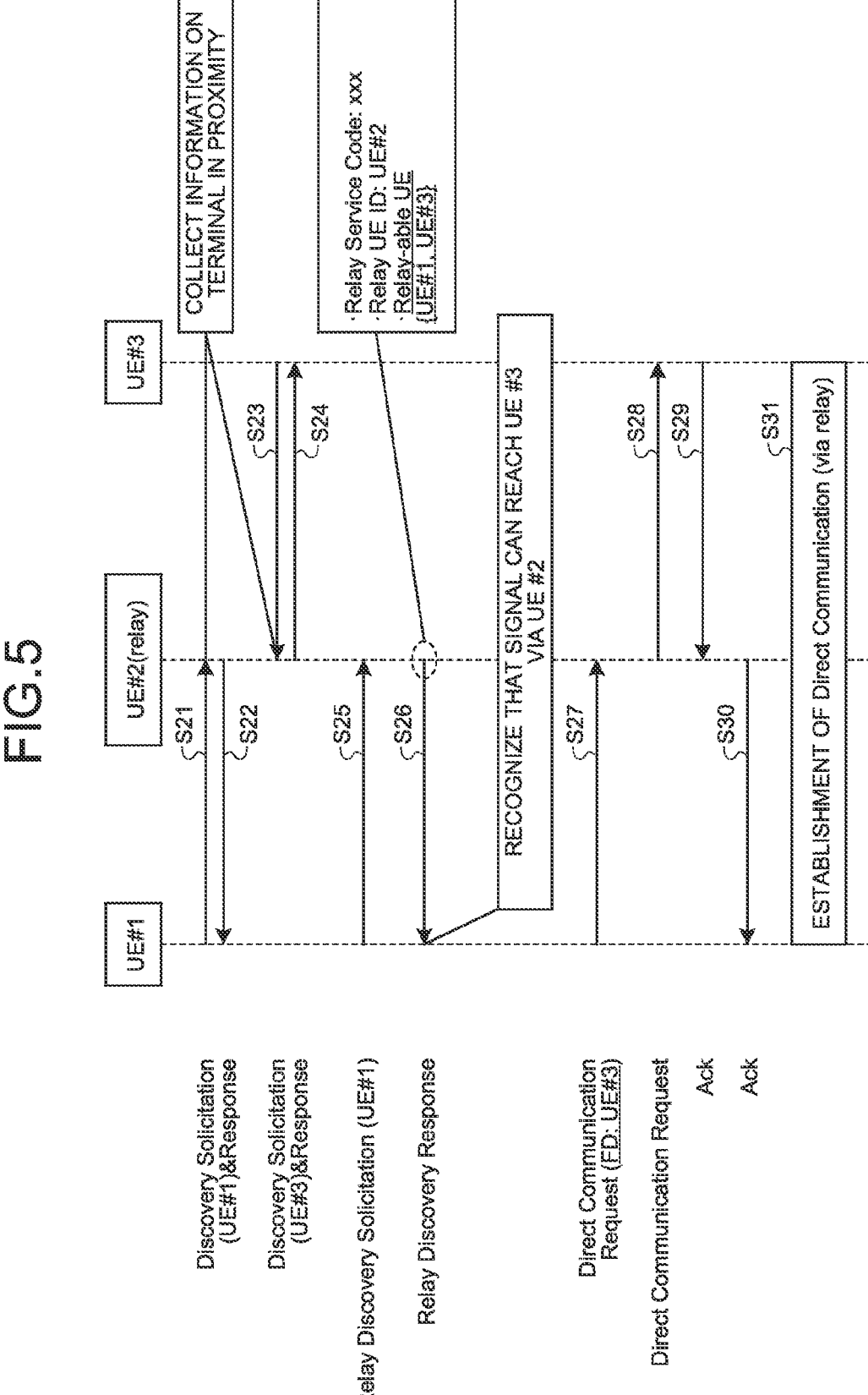
FIG. 5 is a diagram illustrating an example of a sequence of an operation in which terminal devices according to a second embodiment perform terminal-to-terminal communication via a relay station.

FIG. 5 is a diagram illustrating an example of a sequence of the operation in which terminal devices 1 according to the second embodiment perform the terminal-to-terminal communication via a relay station.

The UE #1 and the UE #3 desiring the terminal-to-terminal communication via a relay station transmit "Discovery Solicitation" that is a message for discovering another UE in proximity (steps S21 and S23), and the UE #2 having received the message returns a response message (Response) (steps S22 and S24). As a result, the UE #1 and the UE #3 detect the UE #2 present nearby as the peripheral terminal. Also, the UE #2 detects the UE #1 and the UE #3 present nearby as the peripheral terminals.

Next, the UE #1 transmits "Relay Discovery Solicitation" that is a message for discovering a UE operable as the relay station (step S25). If the UE #2 that has received this message is operable as the relay station, the UE #2 transmits "Relay Discovery Response" that is a response message for notifying that the UE #2 is operable as the relay station (step S26). At this time, the UE #2 transmits the response message including its own terminal ID and the peripheral terminal ID held in the storage unit 17 to the UE #1. FIG. 5 illustrates an example in which the response message transmitted by the UE #2 includes "Relay Service Code", "Relay UE ID", and "Relay-able UE" as parameters. These parameters are similar to the parameters included in the announcement message transmitted by the UE #2 in step S13 of FIG. 4 described in the first embodiment. Note that the UE #2 does not transmit the response message if having received "Relay Discovery Solicitation" but not operable as the relay station. Each response message transmitted by the UE #2 in steps S22, S24, and S26 is an example of a notification message for the UE to notify another UE of its own information. Moreover, the response message transmitted by the UE #2 in step S26 is assumed to be a message having a configuration obtained by extending "Relay Discovery Response message" defined in Non Patent Literature 1 above and adding "Relay-able UE" as a new parameter.

Upon receiving the response message transmitted by the UE #2 in step S26, the UE #1 recognizes that the UE #3 is included as the peripheral terminal of the UE #2, that is, a signal addressed to the UE #3 can reach the UE #3 via the UE #2.

Steps S27 to S31 subsequent to step S26 are the same processing as steps S14 to S18 illustrated in FIG. 4 described in the first embodiment.

As described above, when the terminal device 1 according to the second embodiment receives the message for discovering a UE operable as the relay station (Relay Discovery Solicitation), the terminal device 1 transmits the response message (Relay Discovery Response) including the peripheral terminal ID(s) indicating the peripheral terminal(s) that has been detected at that time. As a result, an effect similar to that of the first embodiment can be obtained.

In the present embodiment, the terminal device 1 detects the peripheral terminal by changing a part of the procedure corresponding to the aforementioned Model B method described in Non Patent Literature 1. Therefore, the terminal-to-terminal communication via a relay station can be implemented by a simple change using an existing method.

Note that the UE #1 may include the terminal ID of the communication counterpart (the UE #3 in the present embodiment) in the message requesting the discovery of the relay station. In this case, the UE #2 having received the message may be adapted to transmit the response message if the UE to be the communication counterpart (here, the UE #3) has been detected, or not transmit the response message otherwise.

Third Embodiment

Next, a terminal device according to a third embodiment will be described. A configuration of a communication system implemented by applying the terminal device according to the third embodiment is similar to that of the first embodiment (see FIG. 1). A functional block configuration of the terminal device according to the third embodiment is also similar to that of the first embodiment (see FIG. 2).

Figure 6:
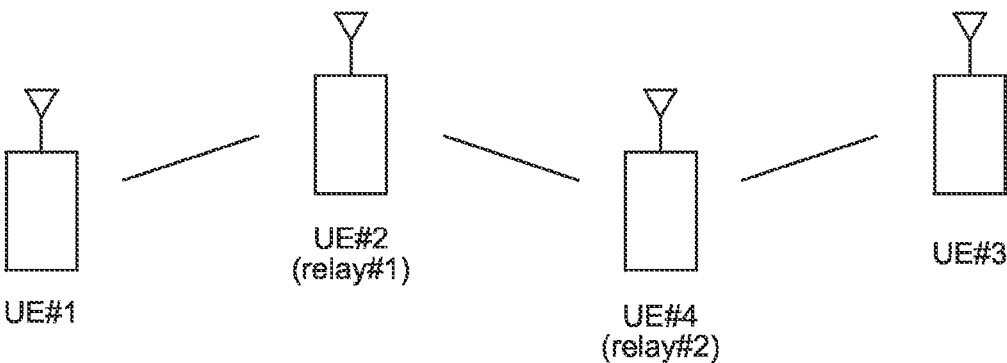
FIG. 6 is a diagram for explaining an operation of terminal devices according to a third embodiment.

The first and second embodiments have described the terminal-to-terminal communication performed by two of the terminal devices 1 via one relay station, whereas the present embodiment will describe terminal-to-terminal communication performed via two or more relay stations. As an example, an operation in a case where the terminal devices 1 are in a positional relationship illustrated in FIG. 6 will be described. The UE #1 illustrated in FIG. 6 is in a state capable of directly communicating with only the UE #2, and the UE #2 is in a state capable of directly communicating with the UE #1 and a UE #4. The UE #4 is in a state capable of directly communicating with the UE #2 and the UE #3, and the UE #3 is in a state capable of directly communicating with only the UE #4. In this case, the communication that is to be performed between the UE #1 and the UE #3 needs to be via the UE #2 and the UE #4. The present embodiment will thus describe an operation in which the UE #2 and the UE #4 operate as the relay stations, and the UE #1 and the UE #3 communicate with each other via the UE #2 and the UE #4. The UE #2 is defined as a first relay station (relay #1), and the UE #4 is defined as a second relay station (relay #2).

Figure 7:
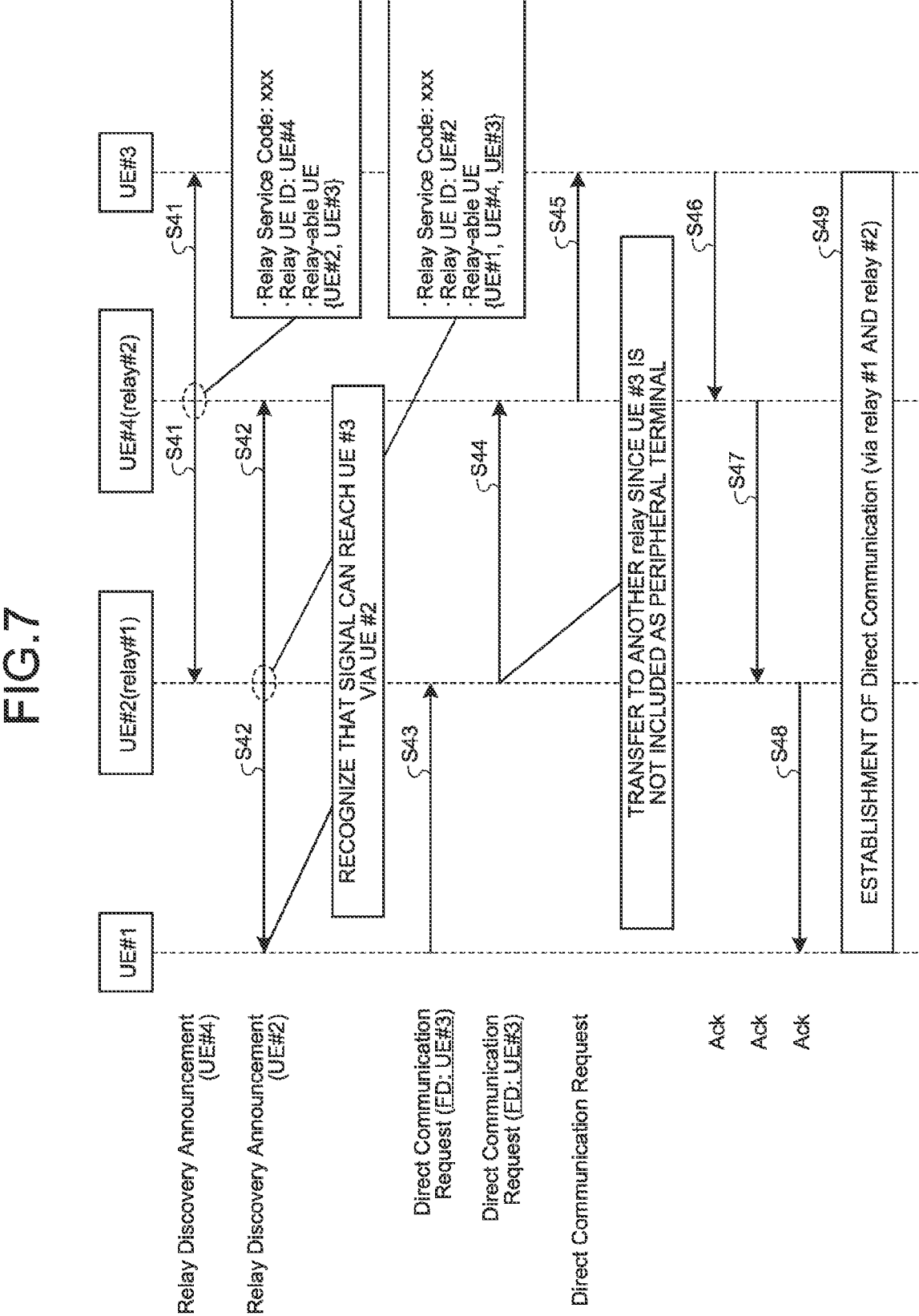
FIG. 7 is a diagram illustrating an example of a sequence of an operation in which the terminal devices according to the third embodiment perform terminal-to-terminal communication via relay stations.

FIG. 7 is a diagram illustrating an example of a sequence of the operation in which the terminal devices 1 according to the third embodiment perform the terminal-to-terminal communication via relay stations.

The UE #2 and the UE #4 each transmit the announcement message (Relay Discovery Announcement) described in the first embodiment at a predetermined timing (steps S41 to S42). At this time, each UE broadcasts the announcement message including its own terminal ID and the peripheral terminal ID held in the storage unit 17. Note that the UE #1 and the UE #3 also broadcast similar announcement messages, which are not illustrated in FIG. 7. It is assumed that the UE #2 has received the announcement message transmitted by the UE #1 and has detected the UE #1, and the UE #4 has received the announcement message transmitted by the UE #3 and has detected the UE #3. Therefore, in step S41, the UE #4 transmits the announcement message including its own terminal ID and the terminal ID of the UE #3 (the peripheral terminal ID).

The UE #2 extracts the terminal ID of the UE #4 and the terminal ID of the UE #3 upon receiving the announcement message transmitted in step S41. Specifically, the detection unit 11 of the UE #2 extracts the terminal ID of the UE #4 and the terminal ID of the UE #3, which is the terminal ID of the peripheral terminal of the UE #4, from the announcement message received, and stores the terminal IDs in the storage unit 17. Then, in step S42, the UE #2 transmits the announcement message including its own terminal ID and the peripheral terminal IDs. At this time, in addition to the peripheral terminals detected by the UE #2, the UE #2 includes the terminal ID of the peripheral terminal (the UE #3) of the UE #4 in the announcement message as the peripheral terminal ID. That is, the UE #2 transmits the announcement message including its own terminal ID and all the peripheral terminal IDs (the terminal ID of the UE #1, the terminal ID of the UE #4, and the terminal ID of the UE #3) held in the storage unit 17. As a result, upon receiving the announcement message transmitted in step S42, the UE #1 can recognize that a signal addressed to the UE #3 can reach the UE #3 via the UE #2. At this time, for example, the announcement message transmitted by the UE #2 in FIG. 7 may include information on the number of relays for reaching each terminal, such as {UE #1 (0), UE #4 (0), UE #3 (1)}, so that a communication path with the minimum number of relays can be selected.

Upon receiving the announcement message transmitted in step S42, the UE #1 extracts all the terminal IDs other than its own terminal ID (the terminal ID of the UE #2, the terminal ID of the UE #4, and the terminal ID of the UE #3) included in the announcement message received, and holds them in the storage unit 17.

Upon recognizing that communication can be established with the UE #3 via the UE #2, the UE #1 transmits a direct communication request message (Direct Communication Request) to the UE #2 while including therein the terminal ID of the UE #3 that is the counterpart terminal of the terminal-to-terminal communication via relay stations (step S43). The direct communication request message transmitted by the UE #1 in step S43 is the same as the direct communication request message transmitted in step S14 of FIG. 4 described in the first embodiment.

Upon receiving the direct communication request message including the terminal ID of the UE #3 as the FD parameter (the terminal ID of the communication counterpart) indicating the communication counterpart from the UE #1, the UE #2 transfers the direct communication request message to the UE #4 because the UE #3 is not included as the peripheral terminal of the UE #2 (step S44). In step S44, the direct communication request message is transmitted from the UE #2 as the source to the UE #4 as the destination while including the terminal ID of the UE #3 as the FD parameter indicating the communication counterpart.

Upon receiving the direct communication request message including the terminal ID of the UE #3 as the FD parameter indicating the communication counterpart from the UE #2, the UE #4 transfers the direct communication request message to the UE #3 (step S45). In step S45, the direct communication request message is transmitted from the UE #4 as the source to the UE #3 as the destination without including the FD parameter indicating the communication counterpart.

Upon receiving the direct communication request message from the UE #4, the UE #3 returns "Ack" (step S46). Upon receiving the "Ack" for the direct communication request message transmitted in step S45, the UE #4 transmits "Ack" for the direct communication request message received in step S44 to the UE #2 (step S47). Upon receiving the "Ack" for the direct communication request message transmitted in step S44, the UE #2 transmits "Ack" for the direct communication request message received in step S43 to the UE #1 (step S48). When the UE #1 receives the "Ack" for the direct communication request message transmitted in step S43, a communication line via the UE #2 (relay #1) and the UE #4 (relay #2) is established between the UE #1 and the UE #3 (step S49). Note that in FIG. 7, the establishment of the communication line via the UE #2 and the UE #4 is described as "establishment of direct communication (via relay #1 and relay #2)".

Note that, in order to simplify the description, the case where there is a single path for relaying signals between the UE #1 and the UE #3 has been described. However, in a case where there is a plurality of paths, each UE selects the path in consideration of quality of communication and the like. In a case where a path once selected cannot be used, such as where the direct communication request message is transmitted but negative acknowledgement (Nack) is received, each UE reselects another path and retransmits the direct communication request message.

In addition, although the case has been described where the two relay stations perform the relay processing between the two terminal devices 1 (the UE #1 and the UE #3) performing the terminal-to-terminal communication, a similar operation is performed in a case where there are three or more relay stations. When the terminal device 1 operating as the relay station receives a message, the terminal device 1 checks whether or not the message has been relayed in the past in order to avoid a loop, and if the message has been relayed, discards the message and returns "Nack". The determination as to whether or not the message has been relayed may be made by any method.

As described above, when the terminal device 1 according to the third embodiment transmits the announcement message for notifying another UE of the presence of the terminal device 1, the terminal device 1 transmits the announcement message including the peripheral terminal ID indicating the peripheral terminal that has been detected at that time as well as the peripheral terminal ID indicating the peripheral terminal that is detected by another one of the terminal devices 1 and notified therefrom. As a result, the terminal device 1 having received the announcement message can recognize the other terminal device 1 available for communication via two or more relay stations. That is, the terminal-to-terminal communication via two or more relay stations can be implemented.

The present embodiment has described the operation in which the terminal-to-terminal communication via two or more relay stations is implemented by modifying the operation of detecting the peripheral terminal by the procedure described in the first embodiment, but the operation of detecting the peripheral terminal can be modified by the procedure described in the second embodiment.

Fourth Embodiment

Next, a terminal device according to a fourth embodiment will be described. A configuration of a communication system implemented by applying the terminal device according to the fourth embodiment is similar to that of the first embodiment (see FIG. 1). A functional block configuration of the terminal device according to the fourth embodiment is also similar to that of the first embodiment (see FIG. 2).

Figure 8:
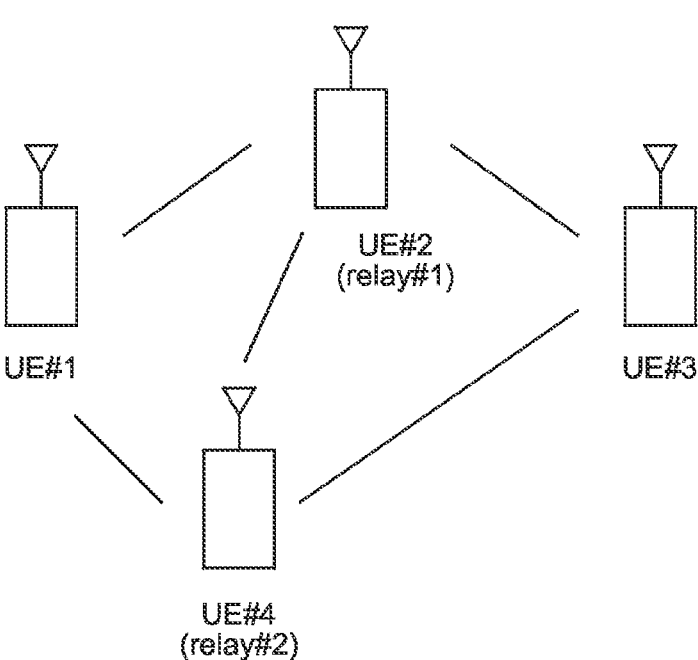
FIG. 8 is a diagram for explaining an operation of terminal devices according to a fourth embodiment.

The first and second embodiments have described the case where there is a single path through which two of the terminal devices 1 can perform the terminal-to-terminal communication via one or more relay stations, whereas the present embodiment will describe an operation of the terminal device 1 in a case where there is a plurality of paths for the terminal-to-terminal communication. As an example, an operation in a case where the terminal devices 1 are in a positional relationship illustrated in FIG. 8 will be described. The UE #1 illustrated in FIG. 8 is in a state capable of directly communicating with the UE #2 and the UE #4, and the UE #2 is in a state capable of directly communicating with the UE #1, the UE #4, and the UE #3. The UE #4 is in a state capable of directly communicating with the UE #1, the UE #2, and the UE #3, and the UE #3 is in a state capable of directly communicating with only the UE #2 and the UE #4. In this case, there is a plurality of paths that can be used when the UE #1 and the UE #3 perform communication.

In the case where there is the plurality of paths selectable for the terminal-to-terminal communication as illustrated in FIG. 8, the communication can be stabilized and improved in quality due to communication redundancy by simultaneously performing the communication through the plurality of paths using a plurality of relay stations. For example, the UE that receives signals through the plurality of paths selects received data having the best quality among a plurality of pieces of the received data for each path. The quality is determined by signal strength, an error rate, and the like. The UE may improve the quality by combining the signals received through the plurality of paths. At this time, in a mode that uses a method of determining a radio resource used by the UE on the side on which the communication is initiated, there is a possibility in that the radio resource used in the communication between a certain relay station and the UE to be the communication counterpart (the UE #3 in the example illustrated in FIG. 8) and the radio resource used in the communication between another relay station and the UE to be the communication counterpart (the UE #3) contend with each other, and the communication efficiency is not improved.

In the present embodiment, the terminal device 1 capable of preventing the contention of the radio resource used in each of the plurality of paths will be described.

Figure 9:
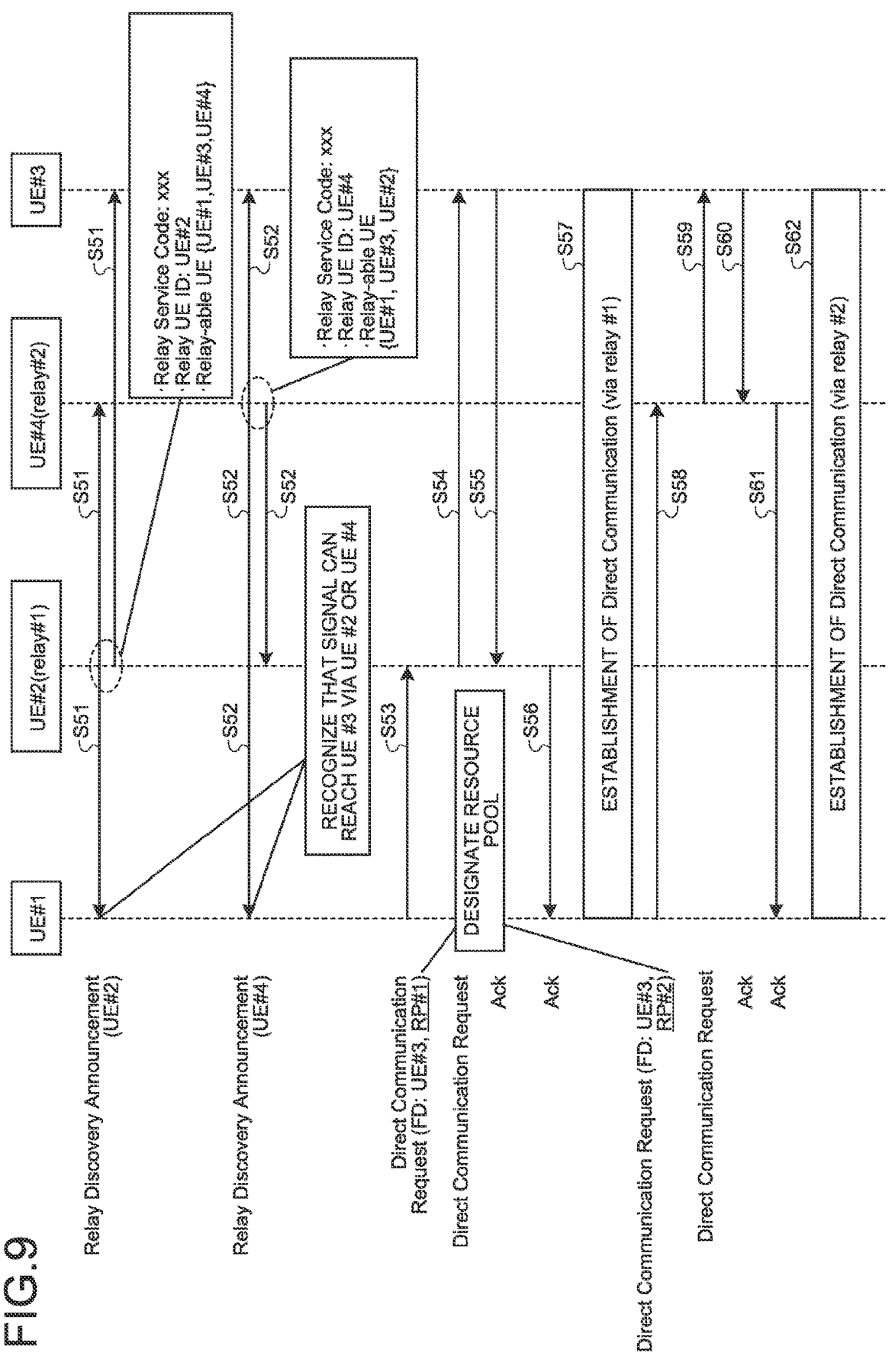
FIG. 9 is a diagram illustrating an example of a sequence of an operation in which the terminal devices according to the fourth embodiment perform terminal-to-terminal communication via a relay station.

FIG. 9 is a diagram illustrating an example of a sequence of the operation in which the terminal devices 1 according to the fourth embodiment perform the terminal-to-terminal communication via a relay station.

The UE #2 and the UE #4 each transmit the announcement message (Relay Discovery Announcement) described in the first embodiment at a predetermined timing (steps S51 to S52). At this time, each UE broadcasts the announcement message including its own terminal ID and the peripheral terminal IDs held in the storage unit 17. Note that the UE #1 and the UE #3 also broadcast similar announcement messages, which are not illustrated in FIG. 9. It is assumed that the UE #2 and the UE #4 have received the announcement message transmitted by the UE #1 and have already detected the UE #1, and also have received the announcement message transmitted by the UE #3 and have already detected the UE #3. Therefore, in step S51, the UE #2 transmits the announcement message including its own terminal ID and the terminal ID of the UE #1, the terminal ID of the UE #3, and the terminal ID of the UE #4. The terminal ID of the UE #1, the terminal ID of the UE #3, and the terminal ID of the UE #4 are the peripheral terminal IDs. Also, in step S52, the UE #4 transmits the announcement message including its own terminal ID and the terminal ID of the UE #1, the terminal ID of the UE #2, and the terminal ID of the UE #3.

Upon receiving the announcement message transmitted in step S51 and the announcement message transmitted in step S52, the UE #1 recognizes that the UE #3 and the UE #4 are included as the peripheral terminals of the UE #2, and that the UE #2 and the UE #3 are included as the peripheral terminals of the UE #4. That is, the UE #1 recognizes that a signal addressed to the UE #3 can reach the UE #3 via any of the UE #2 and the UE #4.

Upon recognizing that communication with the UE #3 is possible via any of the UE #2 and the UE #4, that is, recognizing that there is a plurality of paths available for communication with the UE #3, the UE #1 first transmits a direct communication request message (Direct Communication Request) for establishing a communication path via the UE #2 (relay #1) to the UE #2 (step S53). After that, the UE #1 transmits a direct communication request message for establishing a communication path via the UE #4 (relay #2) to the UE #4 (step S58). Each direct communication request message transmitted by the UE #1 includes an RP parameter (an RP #1 or RP #2) for designating a radio resource used in the communication between the relay station and the UE to be the communication counterpart (the UE #3), in addition to the FD parameter (the parameter indicating the communication counterpart) described in the first embodiment. The UE #1 can thus designate the radio resource such that the radio resource used in each of the plurality of communication paths is different.

Upon receiving the direct communication request message transmitted in step S53, the UE #2 transmits a direct communication request message to the UE #3 using the radio resource indicated by the parameter included in the received direct communication request message (step S54). In step S54, the UE #2 transmits the direct communication request message not including the FD parameter and the RP parameter, that is, the direct communication request message whose source and destination are the UE #2 and the UE #3, respectively. Steps S55 to S57 subsequent to step S54 are processes similar to those of steps S16 to S18 illustrated in FIG. 4 described in the first embodiment.

Upon receiving the direct communication request message transmitted in step S58, the UE #4 transmits a direct communication request message to the UE #3 using the radio resource indicated by the parameter included in the received direct communication request message (step S59). In step S59, the UE #4 transmits the direct communication request message not including the FD parameter and the RP parameter, that is, the direct communication request message whose source and destination are the UE #4 and the UE #3, respectively. Steps S60 to S62 subsequent to step S59 are processes similar to those of steps S16 to S18 illustrated in FIG. 4 described in the first embodiment.

Note that the UE #1 may designate the radio resources such that the radio resource used in the communication between the UE #1 itself and the relay station does not contend with the radio resource used in the communication between the relay station and the UE #3 to be the communication counterpart.

As described above, when performing the terminal-to-terminal communication via a relay station, the terminal device 1 according to the fourth embodiment transmits, to the relay station, the direct communication request message including the FD parameter that indicates the communication counterpart and the RP parameter that designates the radio resource used in the communication between the relay station and the terminal device 1 to be the communication counterpart. The relay station having received the direct communication request message including the FD parameter and the RP parameter uses the radio resource indicated by the RP parameter when communicating with the terminal device 1 indicated by the FD parameter. This can avoid contention of the radio resource used in each of the plurality of communication paths.

In order to simplify the description, the present embodiment has described the case where two of the terminal devices 1 perform the terminal-to-terminal communication via one relay station, but in a case where two of the terminal devices 1 perform the terminal-to-terminal communication via two or more relay stations as well, the direct communication request message including the FD parameter and the RP parameter may be transmitted.

Moreover, the present embodiment has described the operation of detecting the peripheral terminal according to the procedure described in the first embodiment and preventing contention of the radio resource in the case where there is the plurality of paths selectable for the terminal-to-terminal communication. However, the peripheral terminal may be detected according to the procedure described in the second embodiment.

Fifth Embodiment

Next, a terminal device according to a fifth embodiment will be described. A configuration of a communication system implemented by applying the terminal device according to the fifth embodiment is similar to that of the first embodiment (see FIG. 1). A functional block configuration of the terminal device according to the fifth embodiment is also similar to that of the first embodiment (see FIG. 2).

Figure 10:
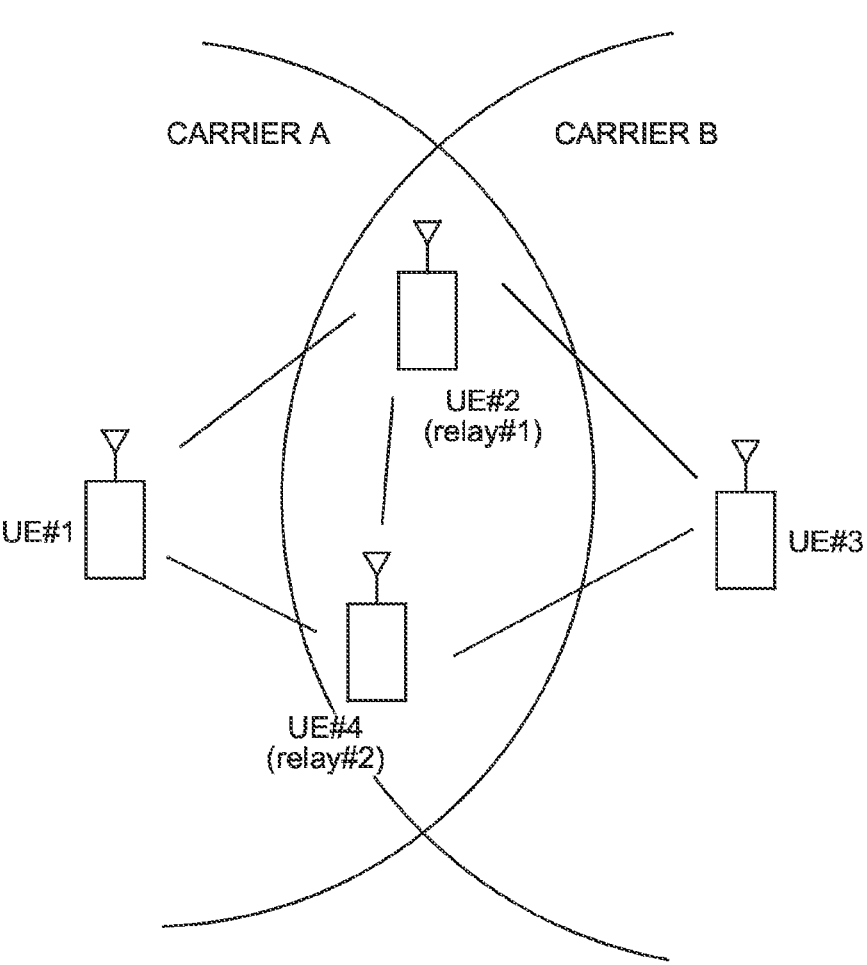
FIG. 10 is a diagram for explaining an operation of terminal devices according to a fifth embodiment.

As with the fourth embodiment, the present embodiment will describe an operation of the terminal device 1 in a case where there is a plurality of paths for the terminal-to-terminal communication. As an example, an operation in a case where the terminal devices 1 are in a positional relationship illustrated in FIG. 10 will be described. The UE #1 illustrated in FIG. 10 is in a state capable of directly communicating with the UE #2 and the UE #4, and the UE #2 is in a state capable of directly communicating with the UE #1, the UE #4, and the UE #3. The UE #4 is in a state capable of directly communicating with the UE #1, the UE #2, and the UE #3, and the UE #3 is in a state capable of directly communicating with only the UE #2 and the UE #4. In this case, there is a plurality of paths that can be used when the UE #1 and the UE #3 perform communication. Moreover, the UE #1 belongs to a carrier A, and the UE #3 belongs to a carrier B.

As illustrated in FIG. 10, in the case where the UE #1 and the UE #3 performing the terminal-to-terminal communication via a relay station belong to the carriers different from each other, that is, in the case where the telecommunications carrier to which the UE #1 belongs is different from the telecommunications carrier to which the UE #3 belongs, the UE #1 initiating communication according to the operation described in the first to fourth embodiments does not know resource pool available between the relay station (the UE #2 or the UE #4 in FIG. 10) and the UE #3 to be the communication counterpart. Thus, the UE #1 cannot designate the radio resource when initiating the terminal-to-terminal communication. The resource pool is a set of radio resources that can be used when the UEs directly communicate with each other.

Therefore, the present embodiment will describe the operation in which the UE (the UE #1), when belonging to a carrier different from a carrier to which the UE (the UE #3) that is the counterpart of the terminal-to-terminal communication via a relay station belongs, initiates the terminal-to-terminal communication by grasping the resource pool available between the relay station (the UE #2 and the UE #4) and the UE to be the communication counterpart (the UE #3).

Figure 11:
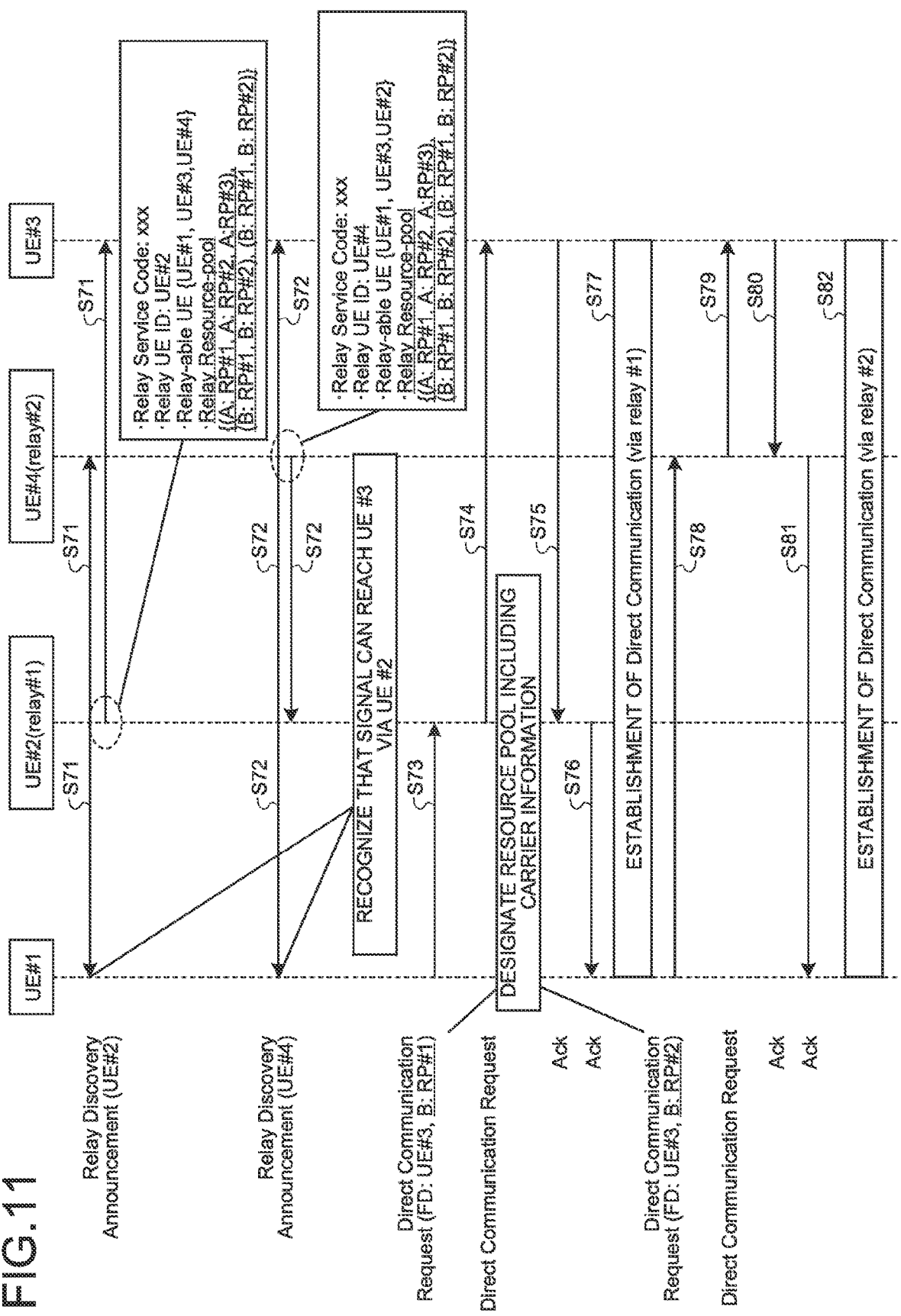
FIG. 11 is a diagram illustrating an example of a sequence of an operation in which the terminal devices according to the fifth embodiment perform terminal-to-terminal communication via a relay station.

FIG. 11 is a diagram illustrating an example of a sequence of the operation in which the terminal devices 1 according to the fifth embodiment perform the terminal-to-terminal communication via a relay station.

As with the fourth embodiment, the UE #2 and the UE #4 each transmit the announcement message (Relay Discovery Announcement) at a predetermined timing (steps S71 to S72). At this time, each UE transmits the announcement message including a resource pool notification parameter (Relay Resource-pool) indicating a resource pool available to each peripheral terminal, in addition to the parameters included in the announcement message transmitted in steps S51 to S52 described in the fourth embodiment. That is, in steps S71 and S72, the UE #2 and the UE #4 transmit the announcement message including the service code (Relay Service Code), its own terminal ID (Relay UE ID), and the peripheral terminal IDs (Relay-able UE) that are described above and the resource pool notification parameter (Relay Resource-pool). The resource pool notification parameter in the example illustrated in FIG. 11 indicates a resource pool, which is available to each peripheral terminal indicated by the peripheral terminal ID, in association with the peripheral terminal ID. For example, in the announcement message transmitted by the UE #2 in step S71, the peripheral terminal ID indicates that relay to the UE #1, the UE #3, and the UE #4 can be performed, and the resource pool notification parameter indicates that the resource pool available to the UE #1 is "A: RP #1, A: RP #2, and A: RP #3", the resource pool available to the UE #3 is "B: RP #1 and B: RP #2", and the resource pool available to the UE #4 is "B: RP #1 and B: RP #2". Note that "A" and "B" in the resource pool notification parameter are carrier information and indicate the carriers to which the UEs belong.

Upon receiving the announcement message transmitted in step S71 and the announcement message transmitted in step S72, the UE #1 recognizes that the UE #3 and the UE #4 are included as the peripheral terminals of the UE #2 and that the UE #2 and the UE #3 are included as the peripheral terminals of the UE #4. The UE #1 also recognizes the resource pool available to each peripheral terminal of the UE #2 and the resource pool available to each peripheral terminal of the UE #4.

Steps S73 to S82 subsequent to steps S71 and S72 are processes similar to those of steps S53 to S62 illustrated in FIG. 9 described in the fourth embodiment. However, when determining the RP parameter to be included in a direct communication request message transmitted in steps S73 and S78, the UE #1 selects the RP parameter from the resource pool available to the UE to be the communication counterpart (the UE #3).

As described above, the terminal device 1 according to the fifth embodiment transmits the announcement message including the peripheral terminal ID indicating the peripheral terminal that has been detected at that time point, and the resource pool notification parameter indicating the resource pool available to each peripheral terminal that has been detected. Also, when performing the terminal-to-terminal communication via a relay station, the terminal device 1 transmits, to the relay station, the direct communication request message including the FD parameter that indicates the communication counterpart and the RP parameter that designates the radio resource used in the communication between the relay station and the terminal device 1 to be the communication counterpart. At this time, the terminal device 1 selects the radio resource from the resource pool available to the communication counterpart, and sets a value indicating the selected radio resource as the RP parameter. The relay station having received the direct communication request message including the FD parameter and the RP parameter uses the radio resource indicated by the RP parameter when communicating with the terminal device 1 indicated by the FD parameter. As a result, even in the case where the terminal devices 1 performing the terminal-to-terminal communication via a relay station belong to the carriers different from each other, the contention of the radio resource used in each of the plurality of communication paths can be avoided.

In order to simplify the description, the present embodiment has described the case where two of the terminal devices 1 perform the terminal-to-terminal communication via one relay station. However, in a case where two of the terminal devices 1 perform the terminal-to-terminal communication via two or more relay stations as well, each terminal device 1 may similarly transmit the announcement message including the resource pool notification parameter that indicates the resource pool available to each peripheral terminal that has been detected.

Moreover, the present embodiment has described the operation in the case where the notification of the available resource pool is made by modifying the operation of detecting the peripheral terminal by the procedure described in the first embodiment, but the operation of detecting the peripheral terminal can also be modified by the procedure described in the second embodiment to make the notification of the available resource pool.

Sixth Embodiment

Next, a terminal device according to a sixth embodiment will be described. A configuration of a communication system implemented by applying the terminal device according to the sixth embodiment is similar to that of the first embodiment (see FIG. 1). A functional block configuration of the terminal device according to the sixth embodiment is also similar to that of the first embodiment (see FIG. 2).

Figure 12:
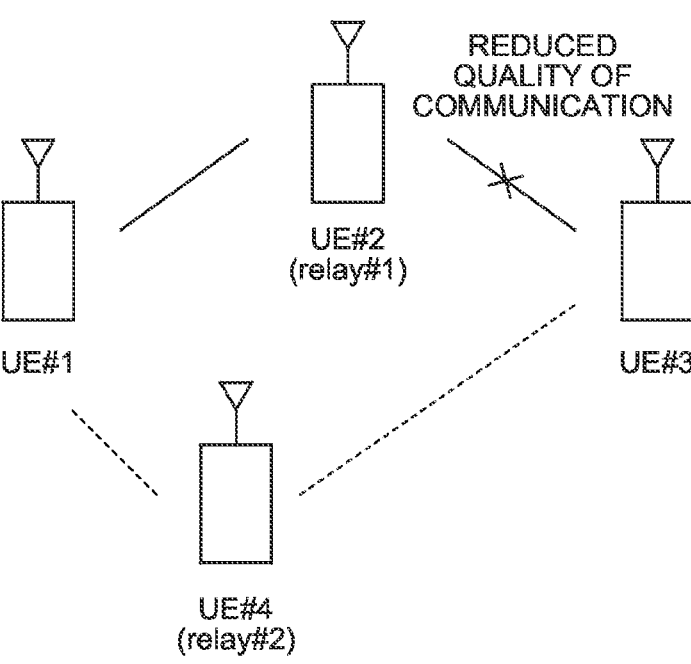
FIG. 12 is a diagram for explaining an operation of terminal devices according to a sixth embodiment.

As with the fourth and fifth embodiments, the present embodiment will describe an operation of the terminal device 1 in a case where there is a plurality of paths for the terminal-to-terminal communication. As an example, an operation in a case where the terminal devices 1 are in a positional relationship illustrated in FIG. 12 will be described. The UE #1 illustrated in FIG. 12 is in a state capable of directly communicating with the UE #2 and the UE #4, and the UE #2 is in a state capable of directly communicating with the UE #1, the UE #4, and the UE #3. The UE #4 is in a state capable of directly communicating with the UE #1, the UE #2, and the UE #3, and the UE #3 is in a state capable of directly communicating with only the UE #2 and the UE #4. Also, in FIG. 12, it is assumed that the UE #1 and the UE #3 are communicating via the UE #2, but the quality of communication between the UE #2 and the UE #3 is reduced.

In the case of the state illustrated in FIG. 12, there is a plurality of paths through which the UE #1 and the UE #3 can communicate so that, when the quality of communication of the path being used is reduced, it is desirable to switch the path to another path and allow the communication to be continued.

Therefore, the present embodiment will describe an operation in which the terminal devices 1 switch the communication path in a case where the path being used in the terminal-to-terminal communication has a problem, and it is difficult to continue the communication.

Figure 13:
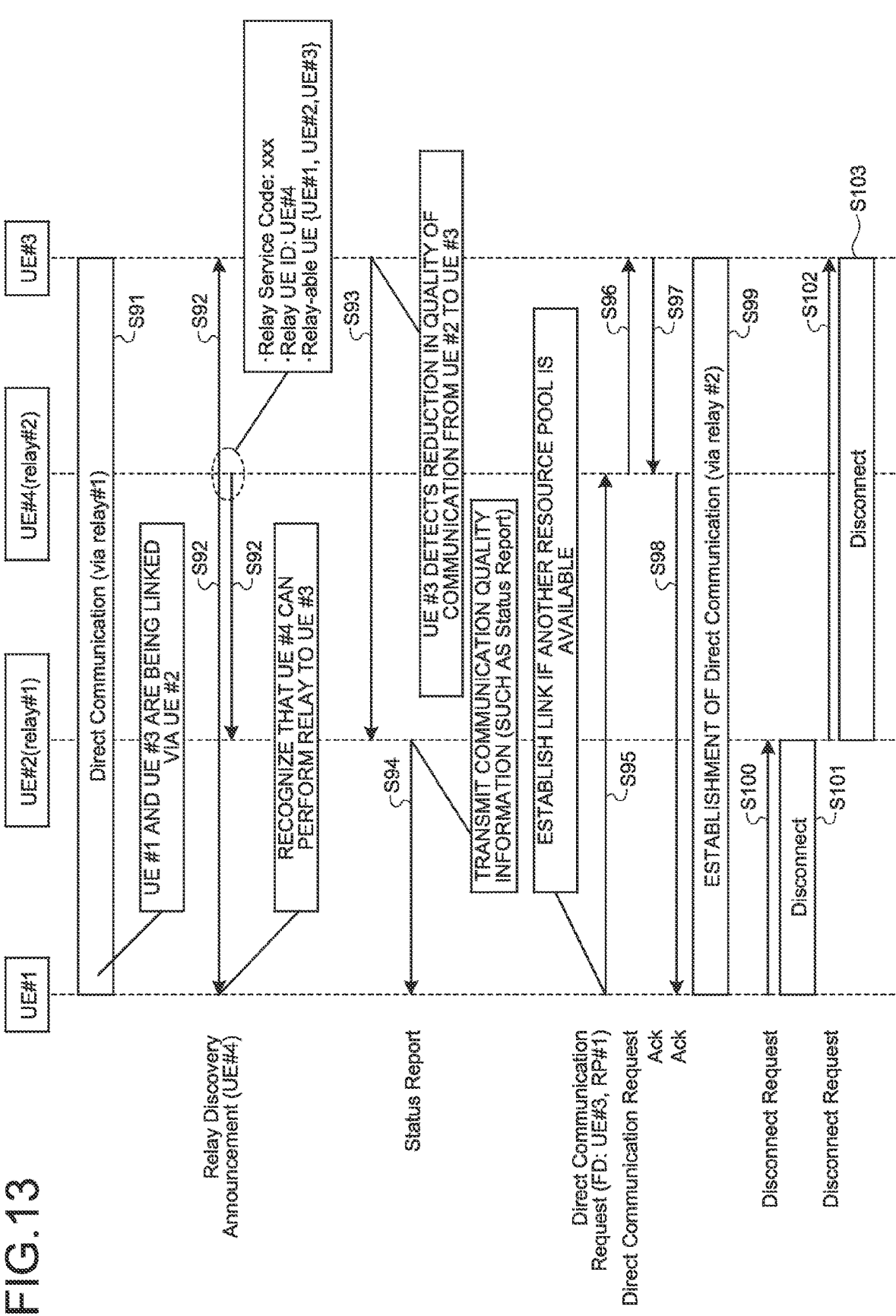
FIG. 13 is a diagram illustrating an example of a sequence of an operation in which the terminal devices according to the sixth embodiment switch a communication path while performing terminal-to-terminal communication via a relay station.

FIG. 13 is a diagram illustrating an example of a sequence of the operation in which the terminal devices 1 according to the sixth embodiment switch the communication path while performing the terminal-to-terminal communication via a relay station.

It is assumed that the UE #1 and the UE #3 are performing the terminal-to-terminal communication via the UE #2 (relay #1) (step S91). At this time, the UE #4 transmits the announcement message (Relay Discovery Announcement) described in the first embodiment at a predetermined timing (step S92).

Upon receiving the announcement message from the UE #4, the UE #1, the UE #2, and the UE #3 recognize that the peripheral terminals of the UE #4 are the UE #1, the UE #2, and the UE #3. As a result, the UE #1 recognizes that the UE #4 can perform relay to the UE #3. That is, the UE #1 recognizes that communication with the UE #3 is possible via the UE #4 as well.

After that, it is assumed that the UE #3 has detected a reduction in the quality of communication with the UE #2 (the quality of communication from the UE #2 to the UE #3). In this case, the UE #3 transmits a state notification message (Status Report) to the UE #2 in order to make notification of the reduction in the quality of communication, and the UE #2 having received the state notification message relays the state notification message to the UE #1 (steps S93 and S94).

Any method may be used as the method by which the UE #3 detects the reduction in the quality of communication. For example, the UE #3 sets a threshold for the strength of received power of a signal, an error rate of data obtained in a physical layer or an upper layer, or the like, and determines that the quality of communication has been reduced when the index in use such as the strength of received power, the error rate, or the like falls below the threshold. At this time, in order to avoid false detection, the UE #3 may determine that the quality of communication has been reduced when, for example, the number of times the index has fallen below the threshold exceeds an upper limit set within a certain period of time.

Note that, although the UE #3 detects the reduction in the quality of communication in the example illustrated in FIG. 13, the UE #3 may transmit the index (the strength of received power, the error rate, or the like) for detecting the reduction in the quality of communication to the UE #1 so that the UE #1 detects the reduction in the quality of communication between the UE #2 and the UE #3. The threshold and the upper limit used for detection may be held by each UE in advance, or may be notified from the side of a core network to each UE via the base station 3 at an arbitrary timing.

Upon receiving the state notification message indicating the reduction in the quality of communication between the UE #2 and the UE #3, in order to switch the communication path, the UE #1 transmits a direct communication request message to the UE #4 that can relay a signal addressed to the UE #3 toward the UE #3 (step S95). The UE #4 transfers the received direct communication request message to the UE #3 (step S96). In step S96, the UE #4 transmits the direct communication request message not including the FD parameter and the RP parameter, that is, the direct communication request message whose source and destination are the UE #4 and the UE #3, respectively. After that, steps S97 to S98 similar to steps S55 to S56 illustrated in FIG. 9 described in the fourth embodiment are executed, and a communication line via the UE #4 (the relay #2) is established between the UE #1 and the UE #3 (step S99).

After the communication line via the UE #4 has been newly established, in order to disconnect the communication line whose quality of communication has been reduced, the UE #1 transmits "Disconnect Request", which is a disconnection request message for requesting disconnection of the communication line, to the UE #2 (step S100), and disconnects the communication line with the UE #2 (step S101).

The UE #2 having received the disconnection request message from the UE #1 transmits a disconnection request message to the UE #3 being the communication counterpart of the UE #1 (step S102), and disconnects the communication line with the UE #3 (step S103).

Note that the present embodiment has described the operation in the case where the reduction in the quality of communication is detected when the plurality of relay stations is available for communication between the UE #1 and the UE #3, but in a case where a reduction in the quality of communication is detected when one relay station is available, the UEs do not perform the processing corresponding to steps S95 to S103 described above. That is, in a case where no communication path is available for switching, the UEs continue the communication even when the quality of communication is reduced.

Moreover, the present embodiment has described, as an example, the operation of switching the communication path when the UE #3 detects the reduction in the quality of communication while the UE #1 and the UE #3 are performing the terminal-to-terminal communication via the UE #2, but the operation of switching the communication path is not limited thereto. For example, when the UE #1 detects a reduction in the quality of communication with the UE #2, the communication path is switched by a similar procedure. In this case, upon detecting the reduction in the quality of communication, the UE #1 executes the processing corresponding to step S95 described above, and the UEs execute the processing corresponding to subsequent steps S96 to S103 to switch the communication path. Also, when the UE #2 detects a reduction in the quality of communication with the UE #1 or with the UE #3, the communication path is switched by a similar procedure. In this case, the UE #2 transmits a state notification message, which indicates that the reduction in the quality of communication is detected, to the UE #1. The UE #1 having received the state notification message executes the processing corresponding to step S95 described above, and the UEs execute the processing corresponding to subsequent steps S96 to S103 to switch the communication path.

As described above, the terminal device 1 according to the sixth embodiment changes the relay station being used and switches the communication path when the quality of communication is reduced while performing the terminal-to-terminal communication via a relay station selected from the plurality of relay stations available. This allows the terminal-to-terminal communication to be continued while maintaining the quality of communication by avoiding the occurrence of interruption, disconnection, or the like of the communication.

In order to simplify the description, the present embodiment has described the case where two of the terminal devices 1 perform the terminal-to-terminal communication via one relay station, but in a case where two of the terminal devices 1 perform the terminal-to-terminal communication via two or more relay stations as well, the communication path may be switched when the quality of communication is reduced.

Moreover, the communication path may be switched in a case where communication is not possible, in addition to the case where the quality of communication is reduced. For example, the communication path may be switched when a signal has not been received on the communication path being used in the terminal-to-terminal communication for an elapsed time of a threshold.

Moreover, in a case where two of the terminal devices 1 are performing the terminal-to-terminal communication via a relay station, and the terminal device 1 as the relay station relays communication quality information transmitted from each terminal device 1, the terminal device 1 as the relay station may transmit the communication quality information received from the other terminal device 1 and communication quality information generated by the terminal device 1 as the relay station together in a superimposed manner, or may transmit the communication quality information separately.

The configurations illustrated in the above embodiments merely illustrate an example so that another known technique can be combined, the embodiments can be combined together, or the configurations can be partially omitted and/or modified without departing from the scope of the present disclosure.

REFERENCE SIGNS LIST

1 terminal device; 3 base station; 10 controller; 11 detection unit; 12 information notification unit; 13 relay processing unit; 14 communication processing unit; 16 wireless communication unit; 17 storage unit; 100 communication system.

The invention claimed is:

1. A terminal device having a relay function of relaying a signal received from a first peripheral terminal among peripheral terminals, which are other terminal devices available for direct communication with the terminal device, to a second peripheral terminal among the peripheral terminals, the terminal device comprising:

a processor, and a memory to store a program which, when executed by the processor, causes the processor to control the terminal device to perform processes of:

detecting the peripheral terminals;

holding peripheral terminal information that is information on each of the detected peripheral terminals in the memory;

transmitting a first notification message to the other terminal devices for notifying the other terminal devices of information on the terminal device, wherein the transmitted first notification message includes the information on the terminal device, and the peripheral terminal information held by the memory, the transmitted first notification message further including a parameter indicating peripheral terminals to which the terminal device can relay signals;

when receiving another notification message transmitted by one of the other terminal devices, extracting other peripheral terminal information included in the received other notification message, storing, in the memory, second peripheral terminal information including the extracted other peripheral terminal information in association with information on the one of the other terminal devices that is a source of the received other notification message;

transmitting a second notification message from the terminal device to the other terminal devices, wherein the second notification message includes the second peripheral terminal information held in the memory; and when performing a terminal-to-terminal communication with one of the other terminal devices via the second peripheral terminal among the peripheral terminals, transmitting a direct communication request message for requesting initiation of the terminal-to-terminal communication to the second peripheral terminal, the direct communication request message including a parameter indicating a third peripheral terminal among the plurality of peripheral terminals that is a counterpart terminal device of the terminal-to-terminal communication.

2. The terminal device according to claim 1, wherein the terminal device sets an announcement message for notifying the other terminal devices of presence of the terminal device as the notification message to be transmitted.

3. The terminal device according to claim 1, wherein the terminal device receives a message for discovering a relay station that performs signal relay processing between two of the terminal devices, and sets, as the notification message to be transmitted, a response message that is transmitted when the terminal device is operable as the relay station.

4. The terminal device according to claim 1, wherein the terminal device transmits the direct communication request message including a resource designation parameter that designates a radio resource to be used in a communication path between the third peripheral terminal and the counterpart terminal.

5. The terminal device according to claim 4, wherein the terminal device transmits the notification message including, in the notification message, a resource pool notification parameter that indicates a resource pool available to each of the peripheral terminals indicated by the peripheral terminal information held in the memory, and the terminal device selects the radio resource designated by the resource designation parameter from the resource pool indicated by the resource pool notification parameter included in the other notification message received from each of the peripheral terminals.

6. The terminal device according to claim 1, wherein when there is a plurality of paths to the counterpart of the terminal-to-terminal communication, the terminal device transmits the direct communication request message to one of the peripheral terminals forming a path different from a path being used in the terminal-to-terminal communication when quality of communication of the path being used in the terminal-to-terminal communication is reduced, and initiates the terminal-to-terminal communication using a new communication line.

7. The terminal device according to claim 6, wherein after initiating the terminal-to-terminal communication using the new communication line, the terminal device transmits a disconnection request message to the peripheral terminal forming the path in which the quality of communication is reduced, and disconnects a communication line that is used until then.

8. A communication method to be executed by a terminal device having a relay function of relaying a signal received from a first peripheral terminal among peripheral terminals, which are other terminal devices available for direct communication with the terminal device, to a second peripheral terminal among the peripheral terminals, the communication method comprising:

detecting the peripheral terminals;

transmitting a first notification message to the other terminal devices for notifying the other terminal devices of information on the terminal device, wherein the transmitted first notification message includes the information on the terminal device, and peripheral terminal information held by a memory of the terminal device, the transmitted first notification message further including a parameter indicating peripheral terminals to which the terminal device can relay signals extracting, when receiving a second notification message transmitted by one of the other terminal devices, information on a peripheral terminal that is information on each of the peripheral terminals detected and included in the received second notification message;

storing the extracted information on the peripheral terminal in association with information on one of the other terminal devices that is a source of the received second notification message, and updating the held peripheral terminal information;

transmitting a third notification message to the other terminal devices for notifying the other terminal devices of the information on the terminal device, wherein the transmitted third notification message includes the information on the terminal device, and the updated peripheral terminal information, the transmitted third notification message further including the parameter indicating peripheral terminals to which the terminal device can relay signals; and relaying a signal received to the second peripheral terminal when (1) receiving the signal that is directed toward the second peripheral terminal from the first peripheral terminal or (2) receiving a signal that is directed toward one of the other terminal devices, which is available for communication via the second peripheral terminal, from the first peripheral terminal, and relaying the signal directed toward one of the other terminal devices to at least one of the other terminal devices.

9. A communication system including a plurality of terminal devices, the terminal devices having a function of directly communicating with other terminal devices, wherein the plurality of the terminal devices each comprises:

a processor, and a memory storing a program which, when executed by the processor, causes the processor to control the terminal device to perform processes of:

detecting peripheral terminals that are the other terminal devices available for direct communication;

holding peripheral terminal information that is information on each of the detected peripheral terminals in the memory;

transmitting a first notification message to the peripheral terminals for notifying the peripheral terminals of information on the terminal device, wherein the transmitted first notification message includes the information on the terminal device, and the peripheral terminal information held by the memory, the transmitted first notification message further including a parameter indicating peripheral terminals to which the terminal device can relay signals;

when receiving a second notification message transmitted by one of the other terminal devices, the terminal device extracts peripheral terminal information included in the received second notification message, stores, in the memory, the extracted peripheral terminal information in association with information on one of the other terminal devices that is a source of the received second notification message and updates the held peripheral terminal information;

transmitting a third notification message to the other terminal devices for notifying the other terminal devices of the information on the terminal device, wherein the transmitted third notification message includes the information on the terminal device, and the updated peripheral terminal information, the transmitted third notification message further including the parameter indicating peripheral terminals to which the terminal device can relay signals; and relaying a signal received to a second peripheral terminal among the peripheral terminals when (1) receiving the signal that is directed toward the second peripheral terminal from a first peripheral terminal among the peripheral terminals or (2) receiving a signal that is directed toward one of the other terminal devices, which is available for communication via the second peripheral terminal, from the first peripheral terminal, and relaying the signal directed toward one of the other terminal devices to at least one of the other terminal devices.

* * * * *